(12) United States Patent
Huang et al.

(10) Patent No.: US 10,890,696 B2
(45) Date of Patent: Jan. 12, 2021

(54) OCULAR OPTICAL SYSTEM

(71) Applicant: GENIUS ELECTRONIC OPTICAL (XIAMEN) CO., LTD., Fujian (CN)

(72) Inventors: Chun-Yang Huang, Taichung (TW); Wan-Chun Chen, Taichung (TW)

(73) Assignee: GENIUS ELECTRONIC OPTICAL CO., LTD., Taichung (TW)

(*) Notice: Subject to any disclaimer, the term of this patent is extended or adjusted under 35 U.S.C. 154(b) by 0 days.

(21) Appl. No.: 16/701,160

(22) Filed: Dec. 3, 2019

(65) Prior Publication Data

US 2020/0166675 A1 May 28, 2020

Related U.S. Application Data

(63) Continuation of application No. 16/255,838, filed on Jan. 24, 2019, now Pat. No. 10,527,763, which is a continuation of application No. 15/813,169, filed on Nov. 15, 2017, now Pat. No. 10,234,604.

(30) Foreign Application Priority Data

Oct. 13, 2017 (CN) .......................... 2017 1 0954299

(51) Int. Cl.
*G02B 3/08* (2006.01)
*G02B 27/01* (2006.01)

(52) U.S. Cl.
CPC ........... *G02B 3/08* (2013.01); *G02B 27/0172* (2013.01); *G02B 27/0101* (2013.01); *G02B 2027/012* (2013.01); *G02B 2027/015* (2013.01); *G02B 2027/0152* (2013.01)

(58) Field of Classification Search
CPC ........................................................ G02B 3/08
USPC ........................................................ 359/743
See application file for complete search history.

(56) References Cited

U.S. PATENT DOCUMENTS 5,617,163 A * 4/1997 Ohtake .................. G03B 15/05
362/16

* cited by examiner

*Primary Examiner* — James C. Jones
(74) *Attorney, Agent, or Firm* — JCIPRNET

(57) ABSTRACT

An ocular optical system configured to allow imaging rays from a display frame to enter an observer's eye through the ocular optical system to form an image is provided. The ocular optical system includes a lens element having an eye-side surface and a display-side surface. The lens element has an optical axis extending from a display side toward an eye side. The display-side surface of the lens element adopts a Fresnel lens design. The ocular optical system satisfies: $4.317 \leq EFL/T1 \leq 12.463$, where EFL represents an effective focal length of the ocular optical system, and T1 represents a thickness of the lens element on the optical axis.

20 Claims, 16 Drawing Sheets

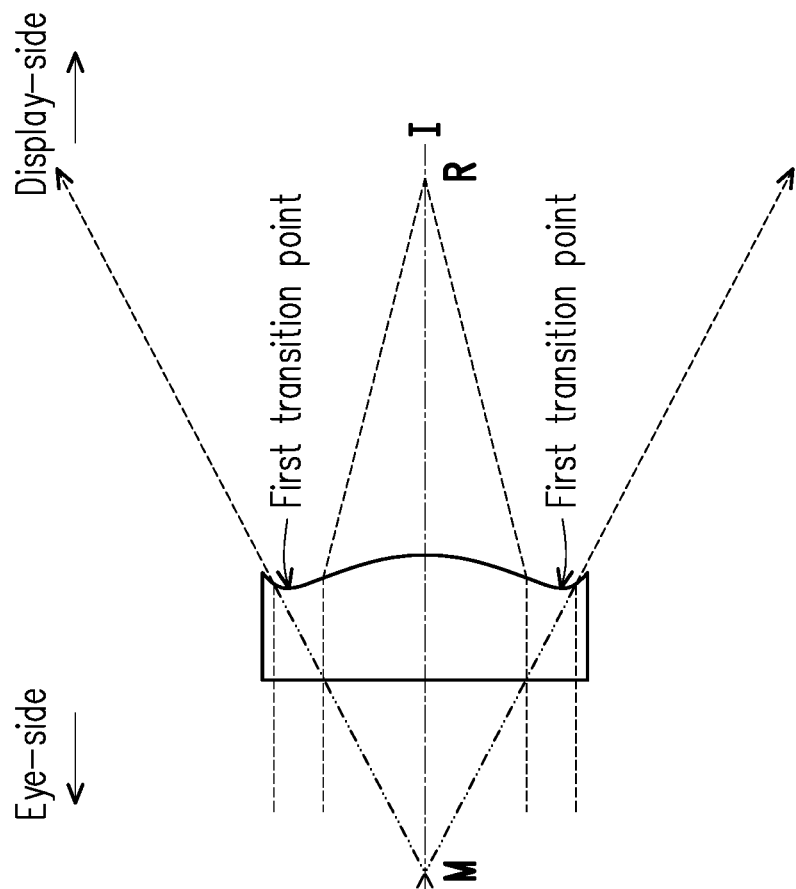
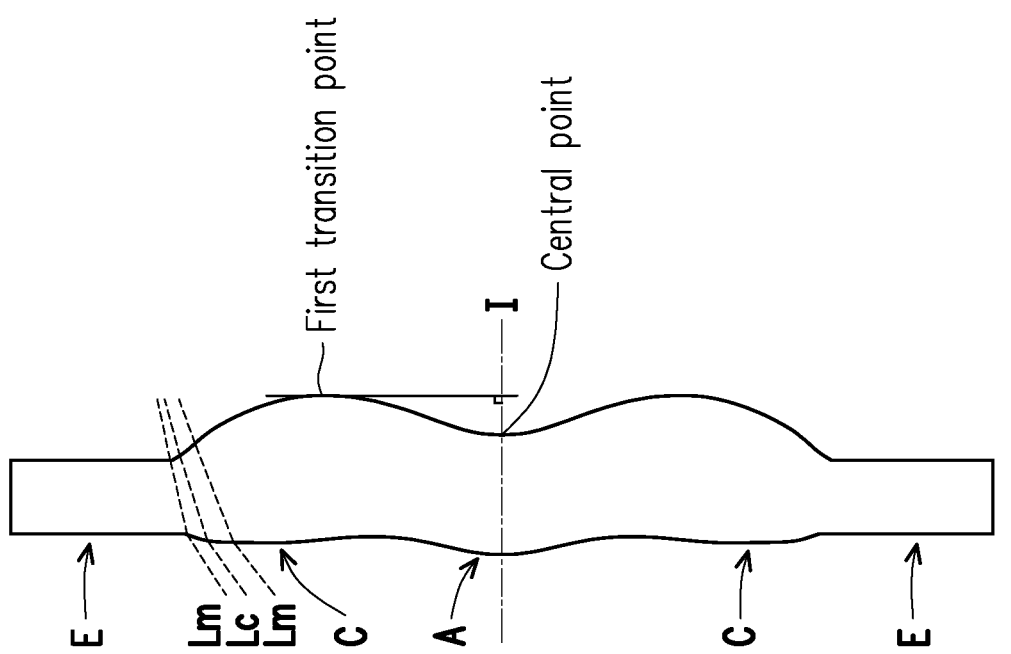
FIG. 3
FIG. 2

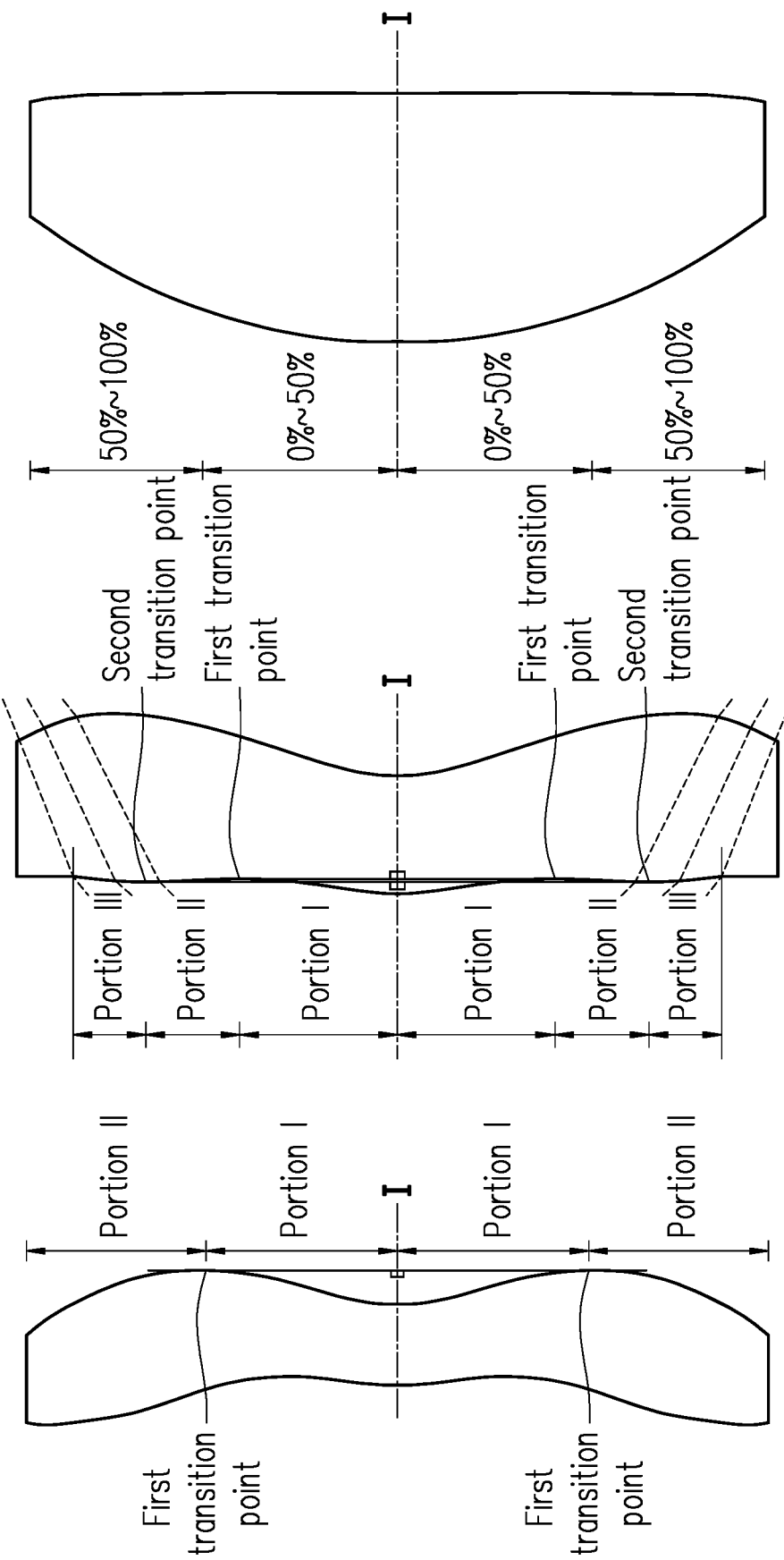

| First embodiment | | | | | | | |
|---|---|---|---|---|---|---|---|
| Effective focal length (EFL)= 34.896 mm, Half apparent field of view ($\omega$)= 47.533°, f-number=8.724, ICD=54.500 mm, System length (SL)= 47.944 mm | | | | | | | |
| Lens element | Surface | Radius of curvature (mm) | Thickness (mm) | Half of clear aperture (mm) | Refractive index | Abbe number | Focal length (mm) |
| Pupil 2 of observer | | Infinity | 12.000 | 2.000 | | | |
| Lens element 3 | Eye-side surface 31 | 120.000 | 2.800 | 16.200 | 1.492 | 57.441 | 34.896 |
| | Display-side surface 32 | -19.976 | 33.144 | 17.100 | | | |
| | Display frame 100 | Infinity | | 27.494 | | | |

FIG. 9

| Surface | K | $a_2$ | $a_4$ | $a_6$ | $a_8$ |
|---|---|---|---|---|---|
| 31 | 0.000000E+00 | 0.000000E+00 | 0.000000E+00 | -1.241000E-08 | 2.708000E-11 |
| 32 | -8.390000E-01 | 0.000000E+00 | 0.000000E+00 | -9.949000E-09 | 1.287000E-12 |
| Surface | $a_{10}$ | $a_{12}$ | $a_{14}$ | $a_{16}$ | |
| 31 | -2.310000E-14 | 0.000000E+00 | 0.000000E+00 | 0.000000E+00 | |
| 32 | 0.000000E+00 | 0.000000E+00 | 0.000000E+00 | 0.000000E+00 | |

FIG. 10

| Second embodiment |||||||
|---|---|---|---|---|---|---|
| Effective focal length (EFL)= 46.740 mm, Half apparent field of view ($\omega$)= 47.371°, f-number=11.685, ICD= 71.000 mm, System length (SL)= 66.898 mm |||||||
| Lens element | Surface | Radius of curvature (mm) | Thickness (mm) | Half of clear aperture (mm) | Refractive index | Abbe number | Focal length (mm) |
| Pupil 2 of observer | | Infinity | 15.000 | 2.000 | | | |
| Lens element 3 | Eye-side surface 31 | 97.894 | 9.266 | 20.500 | 1.492 | 57.441 | 46.740 |
| | Display-side surface 32 | -33.336 | 42.633 | 23.200 | | | |
| | Display frame 100 | Infinity | | 35.546 | | | |

FIG. 13

| Surface | K | $a_2$ | $a_4$ | $a_6$ | $a_8$ |
|---|---|---|---|---|---|
| 31 | -6.765280E+00 | 0.000000E+00 | 0.000000E+00 | 0.000000E+00 | 0.000000E+00 |
| Effective sub-surfaces of 32 | -8.150000E-01 | 0.000000E+00 | 0.000000E+00 | 0.000000E+00 | 0.000000E+00 |
| Base surface of 32 | 1.016790E+01 | 0.000000E+00 | 0.000000E+00 | 0.000000E+00 | 0.000000E+00 |
| Surface | $a_{10}$ | $a_{12}$ | $a_{14}$ | $a_{16}$ | |
| 31 | 0.000000E+00 | 0.000000E+00 | 0.000000E+00 | 0.000000E+00 | |
| Effective sub-surfaces of 32 | 0.000000E+00 | 0.000000E+00 | 0.000000E+00 | 0.000000E+00 | Radius of curvature (mm) |
| Base surface of 32 | 0.000000E+00 | 0.000000E+00 | 0.000000E+00 | 0.000000E+00 | -245.748 |

FIG. 14

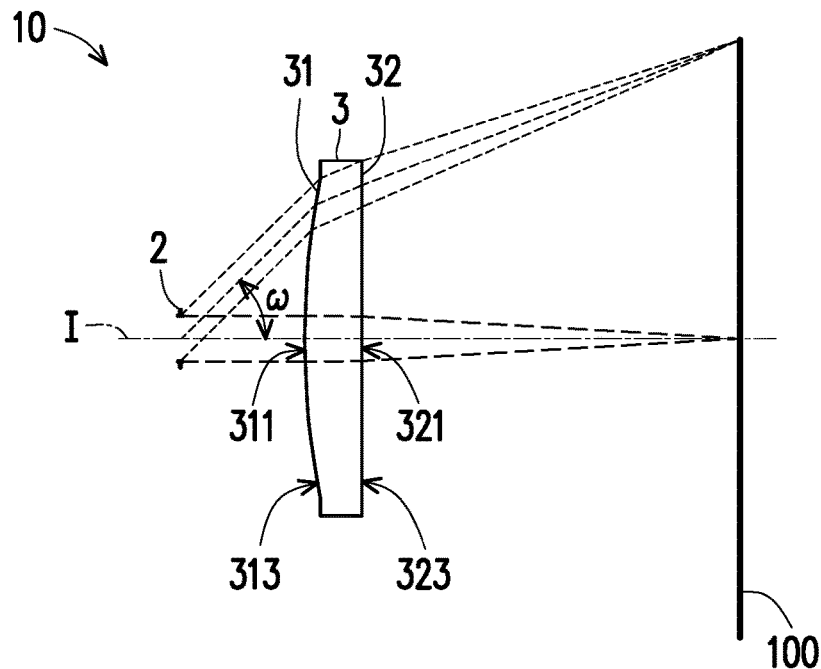
FIG. 15
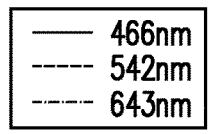
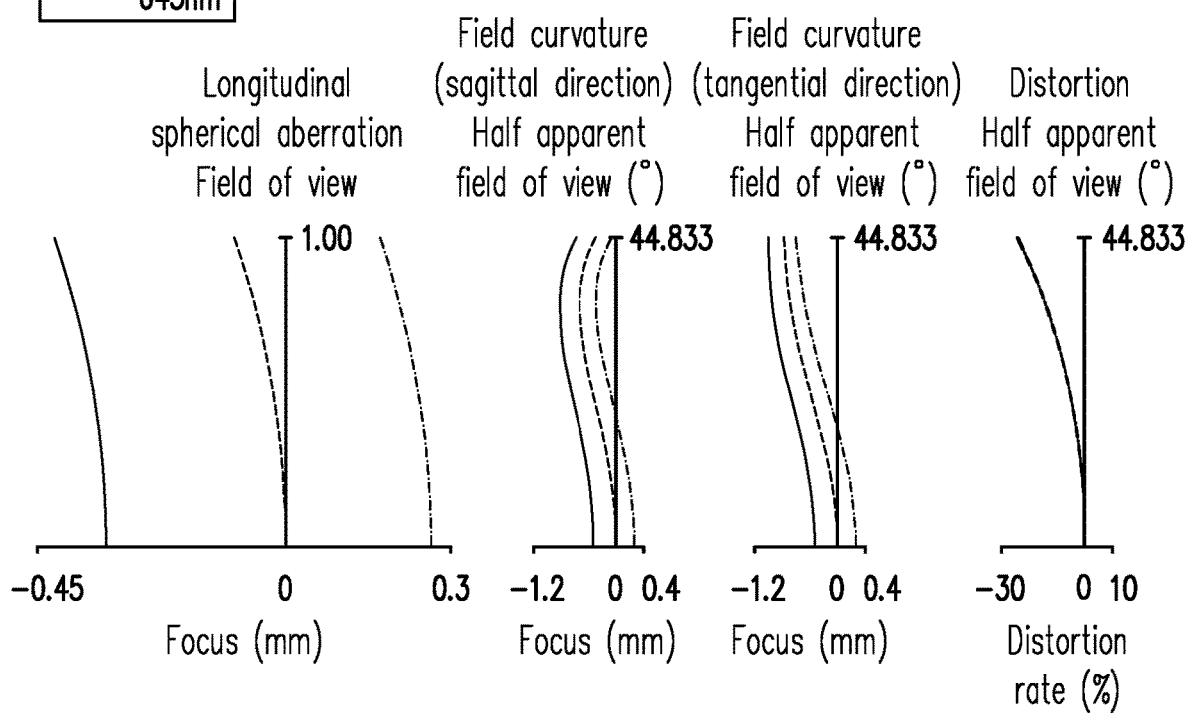
FIG. 16A    FIG. 16B   FIG. 16C   FIG. 16D

| Third embodiment |||||||
|---|---|---|---|---|---|---|
| Effective focal length (EFL)= 32.681 mm, Half apparent field of view ($\omega$)= 44.833°, f-number= 9.078, ICD=48.000 mm, System length (SL)= 45.240 mm |||||||
| Lens element | Surface | Radius of curvature (mm) | Thickness (mm) | Half of clear aperture (mm) | Refractive index | Abbe number | Focal length (mm) |
| Pupil 2 of observer | | Infinity | 10.000 | 1.800 | | | |
| Lens element 3 | Eye-side surface 31 | 68.061 | 4.590 | 13.000 | 1.492 | 57.441 | 32.681 |
| | Display-side surface 32 | -20.694 | 30.650 | 14.400 | | | |
| | Display frame 100 | Infinity | 0.000 | 24.226 | | | |

FIG. 17

| Surface | K | $a_2$ | $a_4$ | $a_6$ | $a_8$ |
|---|---|---|---|---|---|
| 32 | -1.330052E+00 | 0.000000E+00 | 0.000000E+00 | 0.000000E+00 | 0.000000E+00 |
| Surface | $a_{10}$ | $a_{12}$ | $a_{14}$ | $a_{16}$ | |
| 32 | 0.000000E+00 | 0.000000E+00 | 0.000000E+00 | 0.000000E+00 | |

FIG. 18

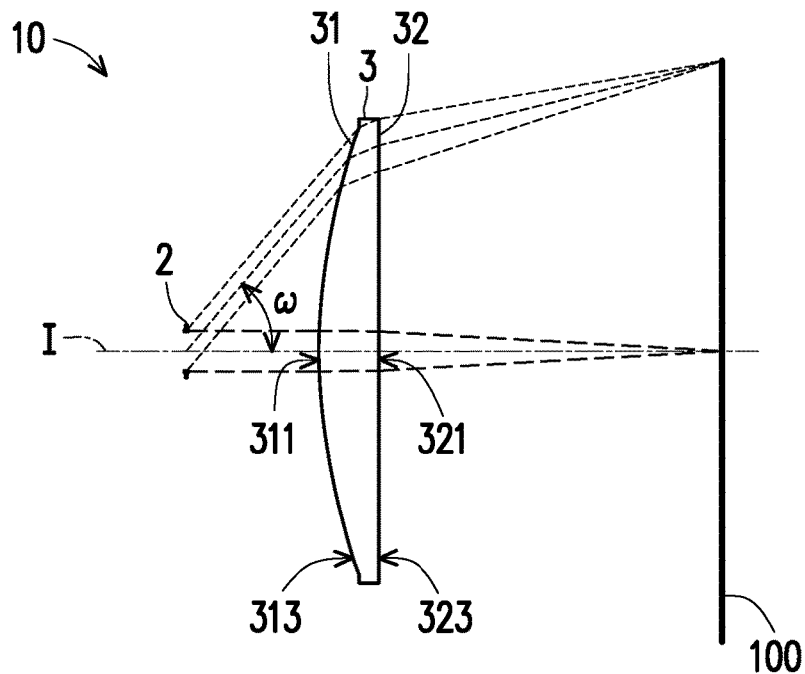
FIG. 19
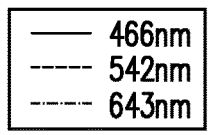
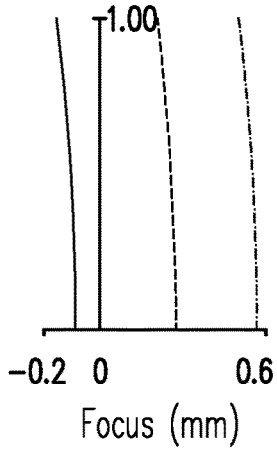
FIG. 20A
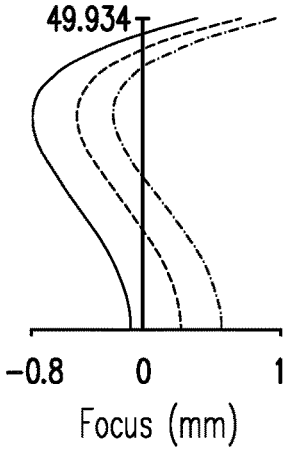
FIG. 20B
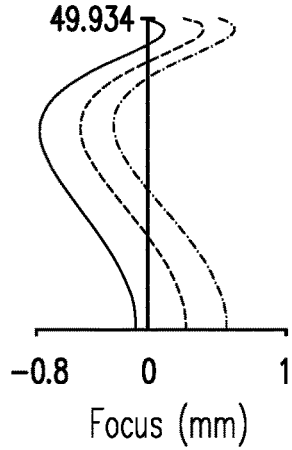
FIG. 20C
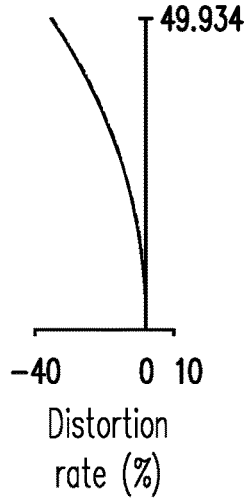
FIG. 20D

| Fourth embodiment | | | | | | | |
|---|---|---|---|---|---|---|---|
| Effective focal length (EFL)= 36.986 mm, Half apparent field of view ($\omega$)= 49.934°, f-number= 9.246, ICD= 56.400 mm, System length (SL)= 52.542 mm | | | | | | | |
| Lens element | Surface | Radius of curvature (mm) | Thickness (mm) | Half of clear aperture (mm) | Refractive index | Abbe number | Focal length (mm) |
| Pupil 2 of observer | | Infinity | 13.000 | 2.000 | | | |
| Lens element 3 | Eye-side surface 31 | 55.079 | 5.780 | 22.100 | 1.492 | 57.441 | 36.986 |
| | Display-side surface 32 | -26.393 | 33.762 | 22.800 | | | |
| | Display frame 100 | Infinity | | 28.400 | | | |

FIG. 21

| Surface | K | $a_2$ | $a_4$ | $a_6$ | $a_8$ |
|---|---|---|---|---|---|
| 31 | -4.772454E+00 | 0.000000E+00 | 0.000000E+00 | 0.000000E+00 | 0.000000E+00 |
| 32 | -1.251003E+00 | 0.000000E+00 | 0.000000E+00 | -3.000000E-09 | 0.000000E+00 |
| Surface | $a_{10}$ | $a_{12}$ | $a_{14}$ | $a_{16}$ | |
| 31 | 0.000000E+00 | 0.000000E+00 | 0.000000E+00 | 0.000000E+00 | |
| 32 | 0.000000E+00 | 0.000000E+00 | 0.000000E+00 | 0.000000E+00 | |

FIG. 22

| Fifth embodiment | | | | | | | |
|---|---|---|---|---|---|---|---|
| Effective focal length (EFL)= 35.271 mm, Half apparent field of view ($\omega$)= 47.566°, f-number=8.818, ICD=56.000 mm, System length (SL)= 54.934 mm | | | | | | | |
| Lens element | Surface | Radius of curvature (mm) | Thickness (mm) | Half of clear aperture (mm) | Refractive index | Abbe number | Focal length (mm) |
| Pupil 2 of observer | | Infinity | 14.000 | 2.000 | | | |
| Lens element 3 | Eye-side surface 31 | 96.847 | 8.170 | 23.000 | 1.492 | 57.441 | 35.271 |
| | Display-side surface 32 | -26.394 | 32.764 | 23.000 | | | |
| | Display frame 100 | Infinity | | 28.274 | | | |

FIG. 25

| Surface | K | $a_2$ | $a_4$ | $a_6$ | $a_8$ |
|---|---|---|---|---|---|
| 31 | -8.476506E-01 | 0.000000E+00 | 8.000000E-09 | 0.000000E+00 | 0.000000E+00 |
| Effective sub-surfaces of 32 | -9.999803E-01 | 0.000000E+00 | -1.004794E-06 | 1.129907E-10 | 1.350088E-12 |
| Base surface of 32 | 0.000000E+00 | 8.000000E-09 | 0.000000E+00 | 0.000000E+00 | 0.000000E+00 |
| Surface | $a_{10}$ | $a_{12}$ | $a_{14}$ | $a_{16}$ | |
| 31 | 0.000000E+00 | 0.000000E+00 | 0.000000E+00 | 0.000000E+00 | |
| Effective sub-surfaces of 32 | 5.333433E-16 | 0.000000E+00 | 0.000000E+00 | 0.000000E+00 | Radius of curvature (mm) |
| Base surface of 32 | 0.000000E+00 | 0.000000E+00 | 0.000000E+00 | 0.000000E+00 | -95.000 |

FIG. 26

| Condition | First embodiment | Second embodiment | Third embodiment | Fourth embodiment | Fifth embodiment |
|---|---|---|---|---|---|
| T1 | 2.800 | 9.266 | 4.590 | 5.780 | 8.170 |
| GD | 33.144 | 42.633 | 30.650 | 33.762 | 32.764 |
| ICD | 54.500 | 71.000 | 48.000 | 56.400 | 56.000 |
| ER | 12.000 | 15.000 | 10.000 | 13.000 | 14.000 |
| R1 | 17.100 | 23.200 | 14.400 | 22.800 | 23.000 |
| SagI | 7.788 | 9.387 | 4.824 | 9.818 | 12.984 |
| EFL | 34.896 | 46.740 | 32.681 | 36.986 | 35.271 |
| SL | 47.944 | 66.898 | 45.240 | 52.542 | 54.934 |
| $\alpha$ | 44.826 | 39.650 | 32.860 | 41.851 | 48.210 |
| R1/SagI | 2.196 | 2.472 | 2.985 | 2.322 | 1.771 |
| ICD/EFL | 1.562 | 1.519 | 1.469 | 1.525 | 1.588 |

FIG. 29

OCULAR OPTICAL SYSTEM

CROSS-REFERENCE TO RELATED APPLICATION

This application is a continuation application of and claims the priority benefit of U.S. application Ser. No. 16/255,838, filed on Jan. 24, 2019, now allowed, which is a continuation application of and claims the priority benefit of U.S. application Ser. No. 15/813,169, filed on Nov. 15, 2017, now patented, which claims the priority benefit of Chinese application serial no. 201710954299.8, filed on Oct. 13, 2017. The entirety of each of the above-mentioned patent applications is hereby incorporated by reference herein and made a part of this specification.

BACKGROUND OF THE INVENTION

Field of the Invention

The invention relates to an optical system, and particularly relates to an ocular optical system.

Description of Related Art

Virtual Reality (VR) refers to using computer technologies to simulate and generate a three-dimensional virtual world, which enables immersive simulation for users by providing simulations pertaining to visual sensation, auditory sensation and other sensations to users. The currently existing VR devices are mainly focused on visual experiences. Binocular parallax of human eyes is simulated by separated images with two slightly different perspectives corresponding to the left and right eyes to achieve a stereo vision. In order to reduce the volume of the VR device so users can receive a magnified visual sensation from a smaller display frame, an ocular optical system with magnifying capability is now one of major topics in research and development for VR.

As far as ocular optical systems are concerned, the design with a Fresnel lens is a viable option to avoid excessive length, thickness, and weight of an optical lens system and pursue a more light-weighted and thinner design. However, the surface of a Fresnel lens has a plurality of concentric annular teeth, and each of the annular teeth has an effective sub-surface able to refract incident light to in a predetermined direction and an ineffective sub-surface adjacent and connected to two adjacent effective sub-surfaces, so stray light may be generated at where the ineffective sub-surface and the effective surface are connected and at the ineffective sub-surface. As a result, the imaging quality is affected. Thus, in addition to designing a lighter and thinner ocular optical lens, how to achieve a desirable imaging quality is also an issue to work on.

SUMMARY OF THE INVENTION

The invention provides an ocular optical system having a lighter weight, a thinner thickness, and lower stray light.

An embodiment of the invention provides an ocular optical system. The ocular optical system is configured to allow imaging rays from a display frame to enter an eye of an observer through the ocular optical system to form an image. A side toward the eye of the observer is an eye side, and a side toward the display frame is a display side. The ocular optical system includes a lens element. The lens element has an eye-side surface that is toward the eye side and allows the imaging rays to pass through and a display-side surface that is toward the display side and allows the imaging rays to pass through. The lens element has an optical axis extending from a display side toward an eye side. The display-side surface of the lens element adopts a Fresnel lens design. The display-side has a plurality of effective sub-surfaces and a plurality of ineffective sub-surfaces. The effective sub-surfaces are configured to allow the image rays to form an image. Each of the ineffective sub-surfaces connects two adjacent effective sub-surfaces. The ocular optical system satisfies: $1.500 \leq R1/SagI \leq 4.000$, wherein SagI represents a total of lengths of a plurality of orthogonal projections of the effective sub-surfaces respectively projected onto the optical axis, and R1 represents a half of a clear aperture of the display-side surface.

Based on the above, since the ocular optical system according to the embodiment of the invention satisfies $1.500 \leq R1/SagI \leq 4.000$, the area of the ineffective sub-surfaces is able to be properly controlled to suppress the stray light of the ocular optical system, thereby rendering a desirable imaging quality of the ocular optical system.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2 is a schematic view illustrating a surface structure of a lens element.

FIG. 3 is a schematic view illustrating a concave and convex surface structure of a lens element and a ray focal point.

FIG. 4 is a schematic view illustrating a surface structure of a lens element according to a first example.

FIG. 5 is a schematic view illustrating a surface structure of a lens element according to a second example.

FIG. 6 is a schematic view illustrating a surface structure of a lens element according to a third example.

FIG. 9 shows detailed optical data pertaining to the ocular optical system according to the first embodiment of the invention.

FIG. 10 shows aspheric parameters pertaining to the ocular optical system according to the first embodiment of the invention.

FIG. 13 shows detailed optical data pertaining to the ocular optical system according to the second embodiment of the invention.

FIG. 14 shows aspheric parameters pertaining to the ocular optical system according to the second embodiment of the invention.

FIG. 15 is a schematic view illustrating an ocular optical system according to a third embodiment of the invention.

FIG. 16A to FIG. 16D illustrate a longitudinal spherical aberration and other aberrations of the ocular optical system according to the third embodiment of the invention.

FIG. 17 shows detailed optical data pertaining to the ocular optical system according to the third embodiment of the invention.

FIG. 18 shows aspheric parameters pertaining to the ocular optical system according to the third embodiment of the invention.

FIG. 19 is a schematic view illustrating an ocular optical system according to a fourth embodiment of the invention.

FIG. 20A to FIG. 20D illustrate a longitudinal spherical aberration and other aberrations of the ocular optical system according to the fourth embodiment of the invention.

FIG. 21 shows detailed optical data pertaining to the ocular optical system according to the fourth embodiment of the invention.

FIG. 22 shows aspheric parameters pertaining to the ocular optical system according to the fourth embodiment of the invention.

FIG. 25 shows detailed optical data pertaining to the ocular optical system according to the fifth embodiment of the invention.

FIG. 26 shows aspheric parameters pertaining to the ocular optical system according to the fifth embodiment of the invention.

FIG. 29 shows important parameters and relation values thereof pertaining to the ocular optical system according to the first to fifth embodiments of the invention.

DESCRIPTION OF THE EMBODIMENTS

Figure 1:
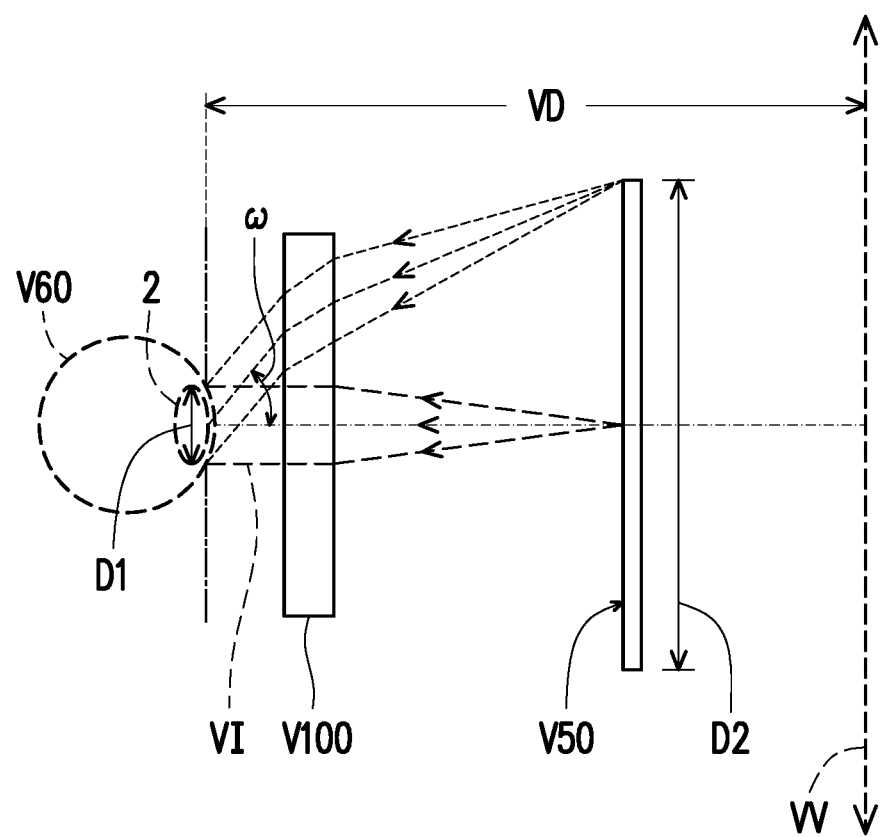
FIG. 1 is a schematic view illustrating an ocular optical system.

In general, a ray direction of an ocular optical system V100 refers to the following: imaging rays VI are emitted by a display screen V50, enter an eye V60 via the ocular optical system V100, and are then focused on a retina of the eye V60 for imaging and generating an enlarged virtual image VV at a virtual image distance VD, as depicted in FIG. 1. The following criteria for determining optical specifications of the present application are based on assumption that a reversely tracking of the ray direction is parallel imaging rays passing through the ocular optical system from an eye-side and focused on the display screen for imaging.

In the present specification, the description "a lens element having positive refracting power (or negative refracting power)" means that the paraxial refracting power of the lens element in Gaussian optics is positive (or negative). The description "An eye-side (or display-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 2 as an example, I is an optical axis and the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element". Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

1. FIG. 2 is a radial cross-sectional view of a lens element. Before determining boundaries of those aforesaid portions, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the $N^{th}$ transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

2. Referring to FIG. 3, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the eye-side or display-side. For instance, if the ray itself intersects the optical axis at the display-side of the lens element after passing through a portion, i.e., the focal point of this ray is at the display-side (see point R in FIG. 3), the portion will be determined as having a convex shape. On the contrary, if the ray diverges after passing through a portion, the extension line of the ray intersects the optical axis at the eye-side of the lens element, i.e., the focal point of the ray is at the eye-side (see point M in FIG. 3), that portion will be determined as having a concave shape. Therefore, referring to FIG. 3, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value which is commonly used in conventional optical design software such as Zemax and CodeV. The R value usually appears in the lens data sheet in the software. For an eye-side surface, positive R means that the eye-side surface is convex, and negative R means that the eye-side surface is concave. Conversely, for a display-side surface, positive R means that the display-side surface is concave, and negative R means that the display-side surface is convex. The result found by using this method should be consistent as by using the other way mentioned above, which determines surface shapes by referring to whether the focal point of a collimated ray is at the display-side or the eye-side.

3. For none transition point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Referring to the first example depicted in FIG. 4, only one transition point, namely a first transition point, appears within the clear aperture of the display-side surface of the lens element. Portion I is a portion in a vicinity of the optical axis, and portion II is a portion in a vicinity of a periphery of the lens element. The portion in a vicinity of the optical axis is determined as having a concave surface due to the R value at the display-side surface of the lens element is positive. The shape of the portion in a vicinity of a periphery of the lens element is different from that of the radially inner adjacent portion, i.e., the shape of the portion in a vicinity of a periphery of the lens element is different from the shape of the portion in a vicinity of the optical axis; the portion in a vicinity of a periphery of the lens element has a convex shape.

Referring to the second example depicted in FIG. 5, a first transition point and a second transition point exist on the eye-side surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the eye-side surface of the lens element is positive. The portion in a vicinity of a periphery of the lens element (portion III) has a convex shape. What is more, there is another portion having a concave shape existing between the first and second transition point (portion II).

Referring to a third example depicted in FIG. 6, no transition point exists on the eye-side surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the eye-side surface of the lens element is determined as having a convex shape due to its positive R value, and the portion in a vicinity of a periphery of the lens element is determined as having a convex shape as well.

Figure 7:
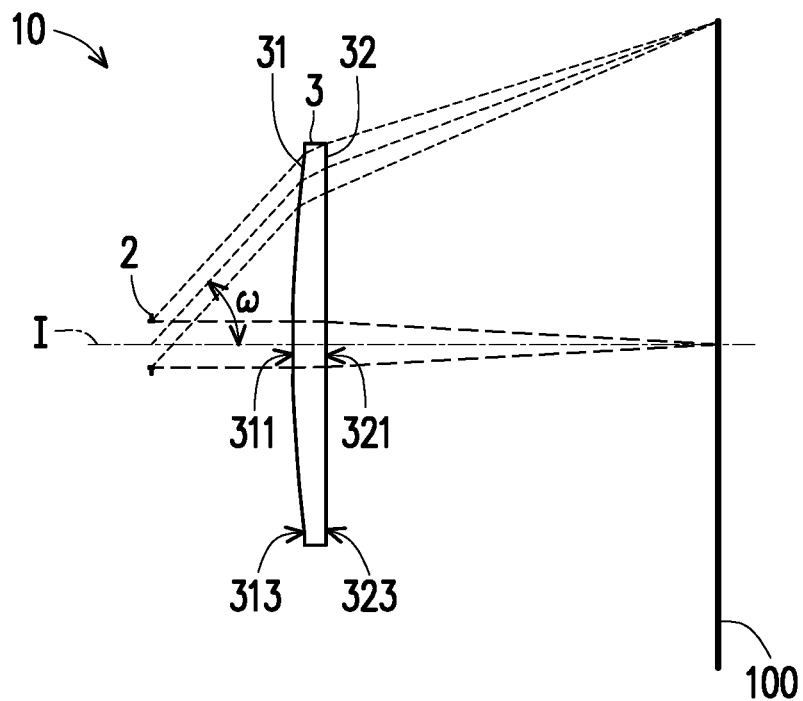
FIG. 7 is a schematic view illustrating an ocular optical system according to a first embodiment of the invention.

FIG. 7 is a schematic view illustrating an ocular optical system according to a first embodiment of the invention, and FIG. 8A to FIG. 8D illustrate a longitudinal spherical aberration and other aberrations of the ocular optical system according to the first embodiment of the invention. Referring to FIG. 7, an ocular optical system 10 according to the first embodiment of the invention is configured to allow imaging rays from a display frame 100 to enter an eye of an observer through the ocular optical system 10 and a pupil 2 of an eye of an observer to form an image. The display frame may be perpendicular to an optical axis or form an included angle not equal to 90 degrees with respect to the display frame. The eye side is a side toward the eye of the observer, and the display side is a side toward the display frame 100.

In the embodiment, the ocular optical system 10 includes a lens element 3. The lens element 3 has an optical axis I extending from the display side toward the eye side. After being emitted, the imaging rays of the display frame 100 may pass through the lens element 3 and enter the eye of the observer from the pupil 2 of the observer. Then, the imaging rays may form an image on a retina of the eye of the observer. Specifically, the lens element 3 of the ocular optical system 10 includes an eye-side surface 31 that is toward the eye side and allows the imaging rays to pass through and a display-side surface 32 that is toward the display side and allows the imaging rays to pass through.

Besides, to meet the demands for a lighter-weighted product, the lens element 3 has a refracting power and is formed of a plastic material. Nevertheless, it should be noted that the material of the lens element 3 is not limited thereto.

Figure 27:
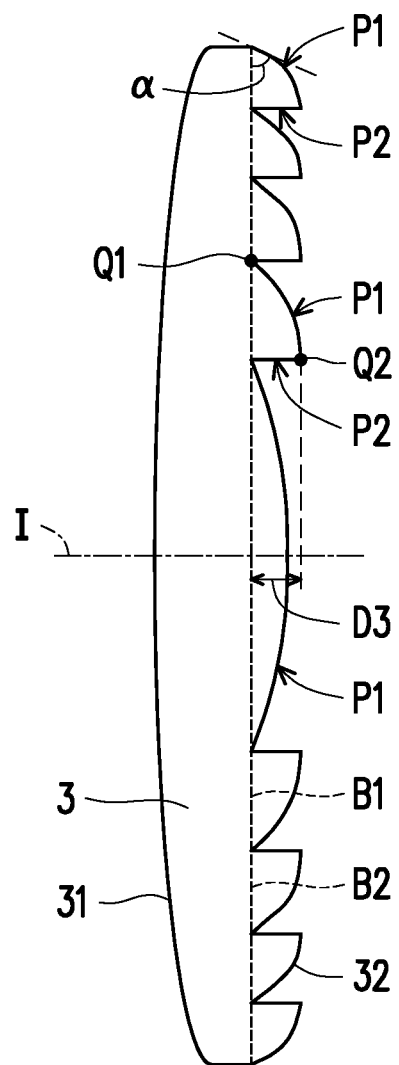
FIG. 27 is a schematic view illustrating a lens element of FIG. 7.

The lens element 3 has a positive refracting power. The eye-side surface 31 of the lens element 3 is a convex surface and has a convex portion 311 in a vicinity of the optical axis I and a convex portion 313 in a vicinity of the periphery of the lens element 3. The display-side surface 32 of the lens element 3 adopts a Fresnel lens design. In the embodiment, the display-side surface 32 is a Fresnel surface, i.e., a surface of the Fresnel lens. FIG. 27 is a schematic view illustrating the lens element of FIG. 7. In order to clearly illustrate the effective sub-surfaces and ineffective sub-surfaces on the display-side surface of the lens element, the sizes of the effective sub-surfaces and the ineffective sub-surfaces are exaggerated, and the numbers of the effective sub-surfaces and the ineffective sub-surfaces are reduced. Referring to FIGS. 7 and 27, the display-side surface 32 has a plurality of effective sub-surfaces P1 and a plurality of ineffective sub-surfaces P2. The effective sub-surfaces P1 are configured for imaging of the imaging rays. Each ineffective sub-surface P2 is connected with two adjacent effective sub-surfaces P1. In addition to the effective sub-surface P1 on the optical axis I being round, the rest of the effective sub-surfaces P1 and the ineffective sub-surfaces P2 are in the shape of concentric circular rings alternately arranged along the radial direction. The effective sub-surfaces P1 and the ineffective sub-surfaces P2 form the Fresnel surface. The display-side surface 32 of the lens element 3 has a convex portion 321 in a vicinity of the optical axis I and a convex portion 323 in a vicinity of the periphery of the lens element 3. In the embodiment, the display-side surface 32 is a plane type Fresnel surface, where each of the effective sub-surfaces P1 of the display-side surface extends from a base surface B1 toward the display side. In addition, the base surface B1 is a surface perpendicular to the optical axis I.

Other detailed optical data of the first embodiment are as shown in FIG. 9. An effective focal length of the ocular optical system 10 of the first embodiment is 34.896 millimeters (mm), a half apparent field of view (ω) thereof is 47.533°, and an f-number (Fno) thereof is 8.724. Specifically, Fno in the specification refers to an f-number obtained through calculation adopting the observer's pupil as an entrance pupil based on the reversibility principle of light. Moreover, in the ocular optical system 10 of the first embodiment, a diameter of an image circle (i.e. an image circle diameter (ICD)) of the display frame 100 corresponding to a maximum angle of view of a single eye of the observer is 54.500 mm, wherein the image circle refers to a maximum range of the display frame viewable by a single eye of the observer through the ocular optical system. In addition, a system length (SL) of the ocular optical system 10 of the first embodiment is 47.944 mm. SL refers to a distance on the optical axis I from the pupil 2 of the observer to the display frame 100.

In the embodiment, the eye-side surface 31 of the lens element 3 is aspheric, and the display-side surface 32 of the lens element 3 is a Fresnel surface. In addition, the effective sub-surface P1 of each tooth of the Fresnel surface is aspheric. Thus, the following aspheric coefficient of the display-side surface 32 serves to represent the effective sub-surfaces P1 of the teeth, and the aspheric surfaces are defined according to the following:

$$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i} \quad (1)$$

wherein
Y: a vertical distance from a point on an aspheric curve to the optical axis I;
Z: a depth of the aspheric surface (i.e., a vertical distance between the point on the aspheric surface that is spaced by the distance Y from the optical axis I and a tangent plane tangent to a vertex of the aspheric surface on the optical axis I);
R: a radius of curvature of the surface of the lens element in a vicinity of the optical axis I;
K: a conic constant;
$\alpha_{2i}$: a $2i^{th}$ aspheric coefficient.

The respective aspheric coefficients of the eye-side surface 31 and the display-side surface 32 of the lens element 3 in Formula (1) are as shown in FIG. 10. In addition, rows labeled with the numeral 31 in FIG. 10 indicate that the aspheric coefficients are the aspheric coefficients of the eye-side surface 31 of the lens element 3, and other numerals and aspheric coefficients are sorted based on the same principle.

In addition, the relations among the important parameters in the ocular optical system 10 of the first embodiment are as shown in FIG. 29.

Figure 28:
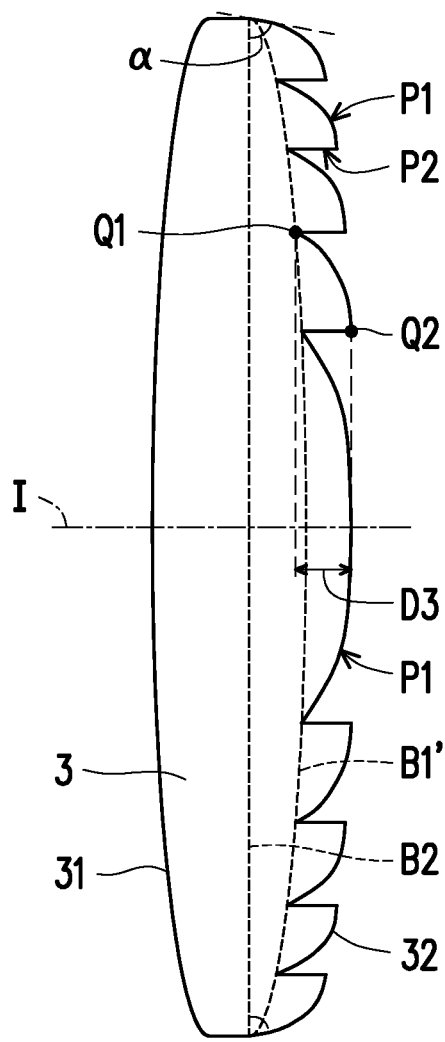
FIG. 28 is a schematic view illustrating a lens element of FIG. 11.

Specifically,
EFL represents a system focal length of the ocular optical system 10, namely the effective focal length of the ocular optical system 10;
ω represents the half apparent field of view, namely a half of a field of view of the observer, as shown in FIG. 1;
T1 represents a thickness of the lens element 3 on the optical axis I;

GD represents a distance on the optical axis I from the display-side surface 32 of the lens element 3 to the display frame 100, namely an air gap on the optical axis I from the lens element 3 to the display frame 100;

TTL represents a distance on the optical axis I from the eye-side surface 31 of the lens element 3 to the display frame 100;

ER represents an eye relief, namely a distance on the optical axis I from the pupil 2 of the observer to the eye-side surface 31 of the lens element 3;

SL represents the system length, namely the distance on the optical axis I from the pupil 2 of the observer to the display frame 100;

EPD represents an eye pupil diameter (as shown in FIG. 1) D1 of the ocular optical system 10 corresponding to a diameter of the pupil 2 of the observer, as shown in FIG. 1;

ICD represents a diameter D2 of an image circle of the display frame 100 corresponding to the maximum angle of view of a single eye of the observer, as shown in FIG. 1;

VD represents a virtual image distance, namely a distance between the enlarged virtual image VV and the pupil 2 (i.e., an exit pupil) of the observer, such as the virtual image distance VD shown in FIG. 1;

α represents a maximum tilting angle of the effective sub-surfaces P1 of the lens element 3 relative to a reference plane B2 perpendicular to the optical axis I, as shown in FIGS. 27 and 28, wherein in the embodiments of the invention, the maximum tilting angle is a tilting angle at the outermost periphery of the effective sub-surface P1 that is most distant from the optical axis I;

R1 represents a half of a clear aperture of the display-side surface 32 of the lens element 3;

SagI represents a total of lengths D3 of a plurality of orthogonal projections of the effective sub-surfaces P1 of the lens element 3 respectively projected onto the optical axis I, as shown in FIGS. 27 and 28, wherein each of the effective sub-surfaces P1 has a starting point Q1 closest to the eye side and a vertex Q2 closest to the display side, and the length D3 of each of the orthogonal projections is a length of the orthogonal projection on the optical axis I from the starting point Q1 to the vertex Q2 of the corresponding effective sub-surface P1.

In addition, the following is also defined:
n1 represents a refractive index of the lens element 3; and
V1 represents an Abbe number of the lens element 3.

In the first embodiment, R1/SagI=2.196.

Referring to FIGS. 8A to 8D, FIGS. 8A to 8D illustrate the respective aberrations of the ocular optical system 10 according to the first embodiment of the invention, assuming that the reversely tracking of the ray direction is parallel imaging rays passing through the pupil 2 and the ocular optical system 10 in order from the eye side and focused on the display frame 100 for imaging. In the embodiment, each aberration behavior shown in each of the figures determines the corresponding aberration behavior for imaging of the imaging rays from the display frame 100 on the retina of the eye of the observer. In other words, when each aberration behavior in each of the aberrations is smaller, each aberration behavior for imaging on the retina of the eye of the observer may also be smaller so the image with better imaging quality is observed by the observer.

Figures 8A, 8B, 8C, 8D:
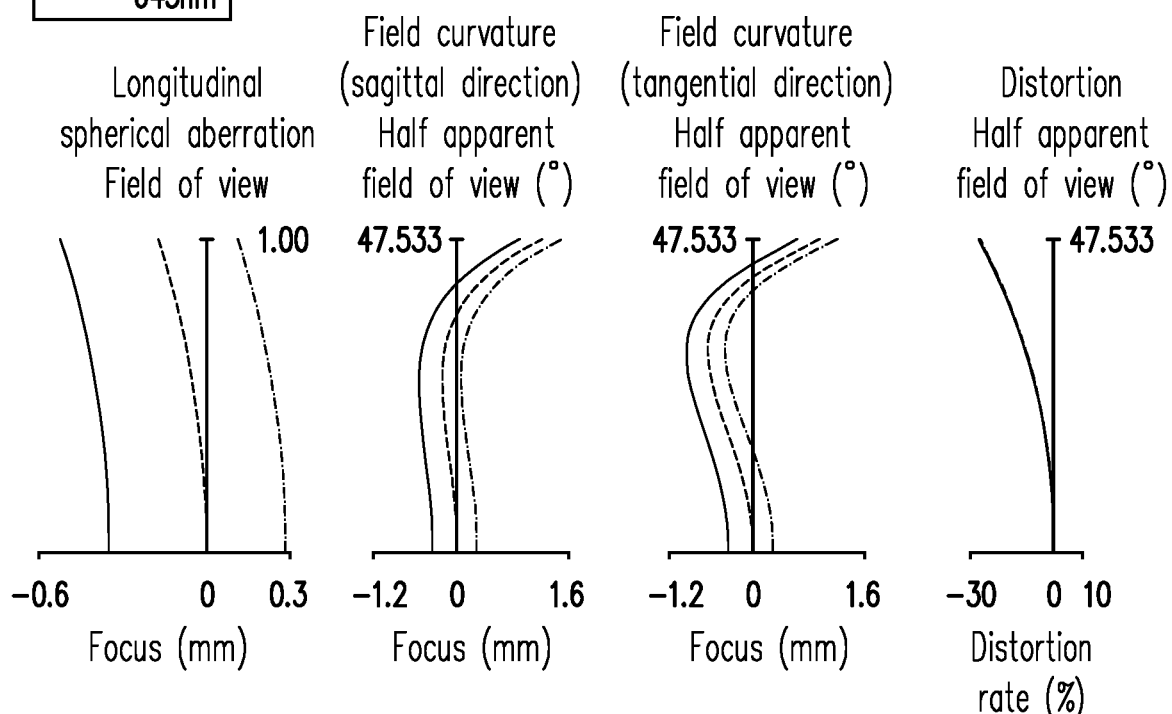
FIG. 8A to FIG. 8D illustrate a longitudinal spherical aberration and other aberrations of the ocular optical system according to the first embodiment of the invention.

Specifically, FIG. 8A illustrates a longitudinal spherical aberration of the first embodiment, FIGS. 8B and 8C respectively illustrate a field curvature aberration in a sagittal direction and a field curvature aberration in a tangential direction of the first embodiment, and FIG. 8D illustrates a distortion aberration of the first embodiment. The longitudinal spherical aberration of the first embodiment shown in FIG. 8A is obtained by simulating under a condition that the pupil radius is 2.000 mm (i.e., the eye pupil diameter EPD of the ocular optical system 10 is 4.000 mm). In FIG. 8A illustrating the longitudinal spherical aberration of the first embodiment, curves representing the respective wavelengths are close to each other and approach the center, indicating that off-axis rays in different heights at the respective wavelengths are concentrated in a vicinity of an imaging point. Based on an extent of deviation of the curve for each of the wavelengths, imaging point deviations of the off-axis rays in different heights are controlled within a range of ±0.55 mm. Therefore, the embodiment clearly improves the spherical aberration of the same wavelength. Besides, distances of curves among wavelengths of 466 nanometers, 542 nanometers, and 643 nanometers, namely the three representative wavelengths, are close to each other, indicating that imaging positions of rays at different wavelengths are concentrated. Therefore, chromatic aberration is improved as well.

In FIGS. 8B and 8C illustrating the two field curvature aberrations, focal distance variations of the three representing wavelengths in the whole field of view fall within a range of ±1.45 mm, indicating that the ocular optical system 10 of the first embodiment is able to effectively eliminate aberrations. In FIG. 8D illustrating the distortion aberration, it is shown that the distortion aberration of the first embodiment is maintained within a range of ±28%, indicating that the distortion aberration of the first embodiment satisfies a requirement on imaging quality for an optical system. Accordingly, compared with the conventional ocular optical system, the ocular optical system of the first embodiment is able to render a desirable imaging quality under a condition that the system length is reduced to about 47.944 mm. Therefore, the first embodiment is able to reduce the length of the ocular optical system while maintaining a desirable optical performance, thereby achieving a thinner product design. Besides, the ocular optical system 10 has a larger apparent field of view, and is also able to correct aberrations and thus maintain a desirable imaging quality. Moreover, in the first embodiment, since 1.500≤R1/SagI≤4.000 is met, the area of the ineffective sub-surfaces P2 is properly controlled. Hence, stray light is suppressed.

Figure 11:
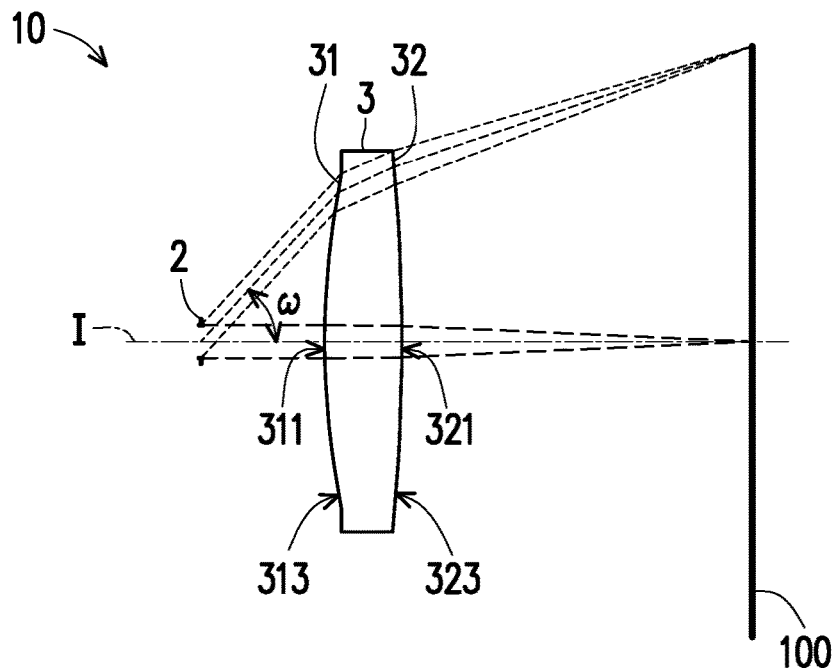
FIG. 11 is a schematic view illustrating an ocular optical system according to a second embodiment of the invention.

FIG. 11 is a schematic view illustrating an ocular optical system according to a second embodiment of the invention, and FIG. 12A to FIG. 12D illustrate a longitudinal spherical aberration and other aberrations of the ocular optical system according to the second embodiment of the invention. Referring to FIG. 11, the second embodiment of the ocular optical system 10 of the invention is roughly similar to the first embodiment, except for some differences in the optical data, aspheric coefficients, and parameters of the lens element 3. Besides, the display-side surface 32 of the lens element 3 in the ocular optical system 10 of the second embodiment is a curve type Fresnel surface, i.e. an extended Fresnel surface. FIG. 28 is a schematic view illustrating the lens element of FIG. 11. In order to clearly illustrate the effective sub-surfaces and ineffective sub-surfaces on the display-side surface of the lens element, the sizes of the effective sub-surfaces and the ineffective sub-surfaces are exaggerated, and the numbers of the effective sub-surfaces and the ineffective sub-surfaces are reduced. Referring to FIGS. 11 and 28, in the embodiment, the display-side surface 32 is a curve type Fresnel surface, where each of the effective sub-surfaces P1 of the display-side surface 32 extends from a base surface B1' toward the display side, and the base surface B1' is a curved surface. In other words, the starting points Q1 of the effective sub-surfaces P1 all fall on the base surface B1' in a curved surface shape. The base surface of the curve type Fresnel surface may be a spherical surface or an aspheric surface similar to a general lens, and the base surface may be rotationally symmetrical with respect to the optical axis I as a symmetrical axis. In the embodiment, the base surface B1' is an aspheric surface.

In the embodiment, the effective sub-surfaces P1 of the display-side surface 32 satisfy Formula (1) for aspheric surfaces. In addition, the base surface B1' of the display-side surface 32 also satisfies Formula (1) for aspheric surfaces, except that the parameter R in Formula (1) is defined as a radius of curvature of the base surface B1' in a vicinity of the optical axis I. Besides, FIG. 14 shows the respective aspheric coefficients of the eye-side surface 31 and the display-side surface 32 of the lens element 3 of the second embodiment in Formula (1). Parameters in the two rows labeled as "effective sub-surfaces of 32" are parameters of the effective sub-surfaces P1 of the display-side surface 32, whereas parameters in the two rows labeled as "base surface of 32" are parameters of the base surface B1' of the display-side surface 32. In addition, "−245.748" (meaning radius of curvature (mm)) in the field at the lower right corner of FIG. 14 indicates that the value of R of the base surface B1' in Formula (1) is −245.748 mm.

Detailed optical data of the ocular optical system 10 of the second embodiment are as shown in FIG. 13. The effective focal length of the ocular optical system 10 of the second embodiment is 46.740 mm, the half apparent field of view (ω) thereof is 47.371°, Fno thereof is 11.685, ICD thereof is 71.000 mm, and SL thereof is 66.898 mm.

In addition, the relations among the important parameters in the ocular optical system 10 of the second embodiment are as shown in FIG. 29. In the embodiment, R1/SagI=2.472, which is superior to the first embodiment.

Figures 12A, 12B, 12C, 12D:
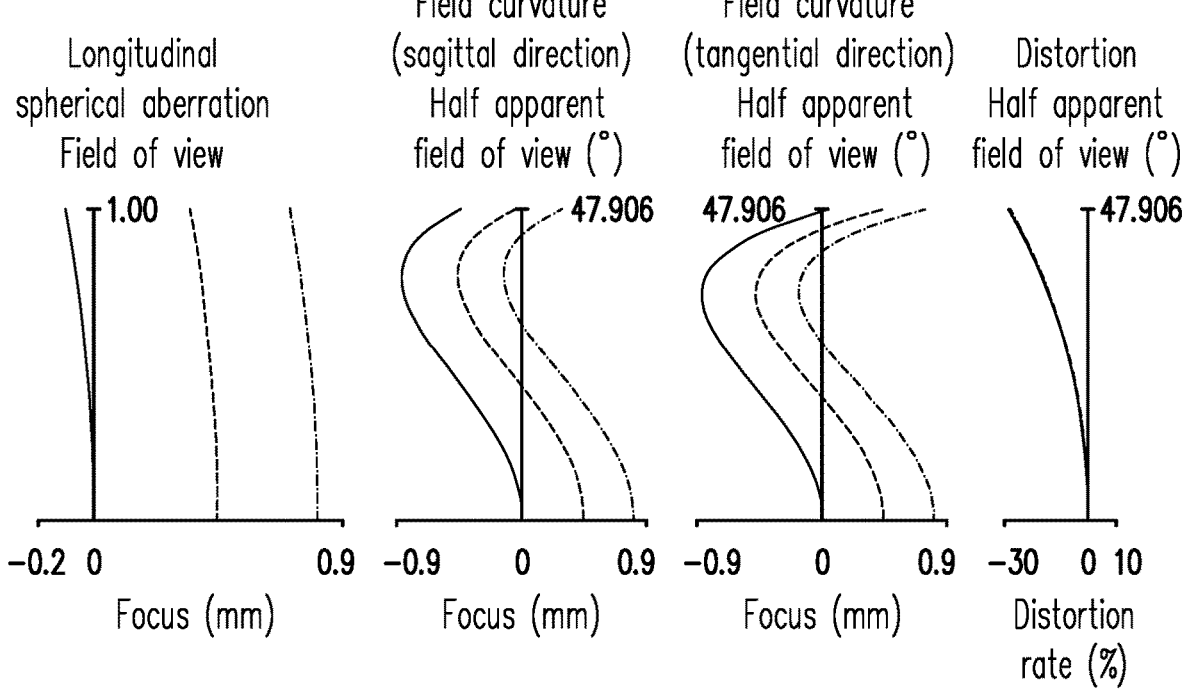
FIG. 12A to FIG. 12D illustrate a longitudinal spherical aberration and other aberrations of the ocular optical system according to the second embodiment of the invention.

The longitudinal spherical aberration of the second embodiment shown in FIG. 12A is obtained by simulating under a condition that the pupil radius is 2.000 mm (i.e., the eye pupil diameter EPD of the ocular optical system 10 is 4.000 mm). In FIG. 12A illustrating the longitudinal spherical aberration of the second embodiment, imaging point deviations of the off-axis rays in different heights are controlled within a range of ±0.83 mm. In FIGS. 12B and 12C illustrating the two field curvature aberrations, focal distance variations of the three representing wavelengths in the whole field of view fall within a range of ±0.9 mm. In FIG. 12D illustrating the distortion aberration, it is shown that the distortion aberration of the second embodiment is maintained within a range of ±30%. Accordingly, compared with the conventional ocular optical system, the ocular optical system of the second embodiment is able to render a desirable imaging quality under a condition that the system length is reduced to about 46.740 mm.

Based on the above, the second embodiment is advantageous over the first embodiment in that the field curvature of the second embodiment is less than that of the first embodiment, and the second embodiment is further able to effectively suppress the influence of stray light.

FIG. 15 is a schematic view illustrating an ocular optical system according to a third embodiment of the invention, and FIG. 16A to FIG. 16D illustrate a longitudinal spherical aberration and other aberrations of the ocular optical system according to the third embodiment of the invention. Referring to FIG. 15, the third embodiment of the ocular optical system 10 of the invention is roughly similar to the first embodiment, except for some differences in the optical data, aspheric coefficients, and parameters of the lens element 3.

What differs from the first embodiment is that the eye-side surface 31 of the lens element 3 of the third embodiment is a spherical surface. Similar to the first embodiment, the display-side surface 32 of the lens element 3 of the third embodiment is a plane type Fresnel surface, and the base surface B1 of the display-side surface 32 is a plane perpendicular to the optical axis I.

Detailed optical data of the ocular optical system 10 of the third embodiment are as shown in FIG. 17. In addition, the effective focal length of the ocular optical system 10 of the third embodiment is 32.681 mm, the half apparent field of view (ω) thereof is 44.833°, Fno thereof is 9.078, ICD thereof is 48.000 mm, and SL thereof is 45.240 mm.

FIG. 18 shows the respective aspheric coefficients of the display-side surface 32 of the lens element 3 of the third embodiment in Formula (1).

In addition, the relations among the important parameters in the ocular optical system 10 of the third embodiment are as shown in FIG. 29. In the embodiment, R1/SagI=2.985, which is superior to the first embodiment.

The longitudinal spherical aberration of the third embodiment shown in FIG. 16A is obtained by simulating under a condition that the pupil radius is 1.800 mm (i.e., the eye pupil diameter EPD of the ocular optical system 10 is 3.600 mm). In FIG. 16A illustrating the longitudinal spherical aberration of the third embodiment, imaging point deviations of the off-axis rays in different heights are controlled within a range of ±0.43 mm. In FIGS. 16B and 16C illustrating the two field curvature aberrations, focal distance variations of the three representing wavelengths in the whole field of view fall within a range of ±1.1 mm. In FIG. 16D illustrating the distortion aberration, it is shown that the distortion aberration of the third embodiment is maintained within a range of ±25%. Accordingly, compared with the conventional ocular optical system, the ocular optical system of the third embodiment is able to render a desirable imaging quality under a condition that the system length is reduced to about 45.240 mm.

Based on the above, the third embodiment is advantageous over the first embodiment in that the system length of the third embodiment is less than that of the first embodiment, the longitudinal spherical aberration of the third embodiment is less than that of the first embodiment, the field curvature of the third embodiment is less than that of the first embodiment, and the distortion of the third embodiment is less than that of the first embodiment. In addition, the third embodiment is further able to effectively suppress the influence of stray light.

FIG. 19 is a schematic view illustrating an ocular optical system according to a fourth embodiment of the invention, and FIG. 20A to FIG. 20D illustrate a longitudinal spherical aberration and other aberrations of the ocular optical system according to the fourth embodiment of the invention. Referring to FIG. 19, the fourth embodiment of the ocular optical system 10 of the invention is roughly similar to the first embodiment, except for some differences in the optical data, aspheric coefficients, and parameters of the lens element 3. Similar to the first embodiment, the display-side surface 32 of the lens element 3 of the fourth embodiment is a plane type Fresnel surface, and the base surface B1 of the display-side surface 32 is a plane perpendicular to the optical axis I.

Detailed optical data of the ocular optical system 10 are as shown in FIG. 21. In addition, the effective focal length of the ocular optical system 10 of the fourth embodiment is 36.986 mm, the half apparent field of view (ω) thereof is 49.934°, Fno thereof is 9.246, ICD thereof is 56.400 mm, and SL thereof is 52.542 mm.

FIG. 22 shows the respective aspheric coefficients of the eye-side surface 31 and the display-side surface 32 of the lens element 3 of the fourth embodiment in Formula (1).

In addition, the relations among the important parameters in the ocular optical system 10 of the fourth embodiment are as shown in FIG. 29. In the embodiment, R1/SagI=2.322, which is superior to the first embodiment.

The longitudinal spherical aberration of the fourth embodiment shown in FIG. 20A is obtained by simulating under a condition that the pupil radius is 2.000 mm (i.e., the eye pupil diameter EPD of the ocular optical system 10 is 4.000 mm). In FIG. 20A illustrating the longitudinal spherical aberration of the fourth embodiment, imaging point deviations of the off-axis rays in different heights are controlled within a range of ±0.59 mm. In FIGS. 20B and 20C illustrating the two field curvature aberrations, focal distance variations of the three representing wavelengths in the whole field of view fall within a range of ±1 mm. In FIG. 20D illustrating the distortion aberration, it is shown that the distortion aberration of the fourth embodiment is maintained within a range of ±35%. Accordingly, compared with the conventional ocular optical system, the ocular optical system of the fourth embodiment is able to render a desirable imaging quality under a condition that the system length is reduced to about 52.542 mm.

Based on the above, the fourth embodiment is advantageous over the first embodiment in that the half apparent field of view of the fourth embodiment is greater than that of the first embodiment and the field curvature of the fourth embodiment is less than that of the first embodiment. In addition, the fourth embodiment is further able to effectively suppress the influence of stray light.

Figure 23:
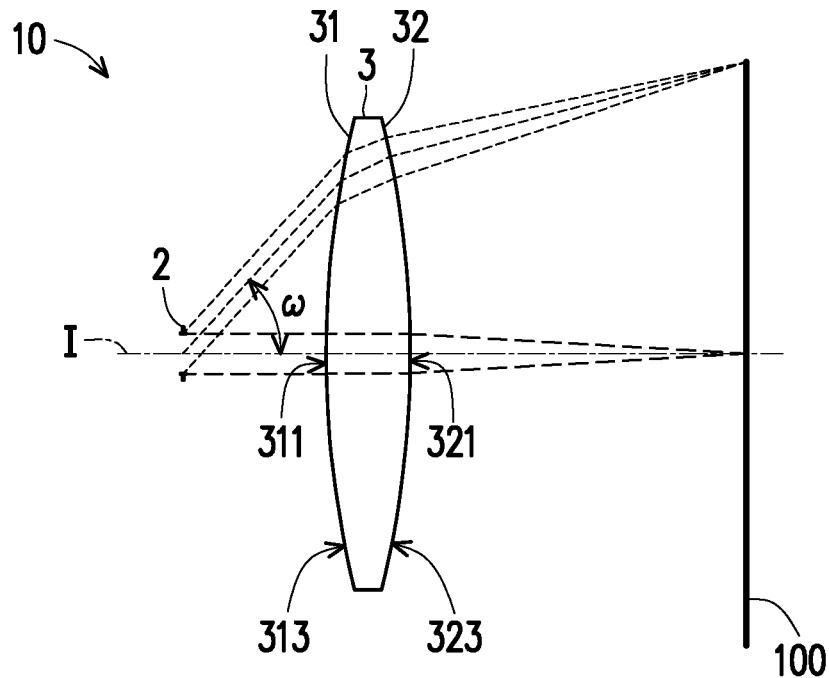
FIG. 23 is a schematic view illustrating an ocular optical system according to a fifth embodiment of the invention.

FIG. 23 is a schematic view illustrating an ocular optical system according to a fifth embodiment of the invention, and FIG. 24A to FIG. 24D illustrate a longitudinal spherical aberration and other aberrations of the ocular optical system according to the fifth embodiment of the invention. Referring to FIG. 23, the fifth embodiment of the ocular optical system 10 of the invention is roughly similar to the first embodiment, except for some differences in the optical data, aspheric coefficients, and parameters of the lens element 3. In the embodiment, the display-side surface 32 of the lens element 3 is a curve type Fresnel surface, the base surface B1' of the display-side surface 32 is a curved surface, such as an aspheric surface.

Detailed optical data of the ocular optical system 10 of the fifth embodiment are as shown in FIG. 25. In addition, the effective focal length of the ocular optical system 10 of the fifth embodiment is 35.271 mm, a half apparent field of view (ω) thereof is 47.566°, Fno thereof is 8.818, ICD thereof is 56.000 mm, and SL thereof is 54.934 mm.

FIG. 26 shows the respective aspheric coefficients of the eye-side surface 31 and the effective sub-surfaces P1 and the base surface B1' of the display-side surface 32 of the lens element 3 of the fifth embodiment in Formula (1).

In addition, the relations among the important parameters in the ocular optical system 10 of the fifth embodiment are as shown in FIG. 29. In the embodiment, R1/SagI=1.771.

Figures 24A, 24B, 24C, 24D:
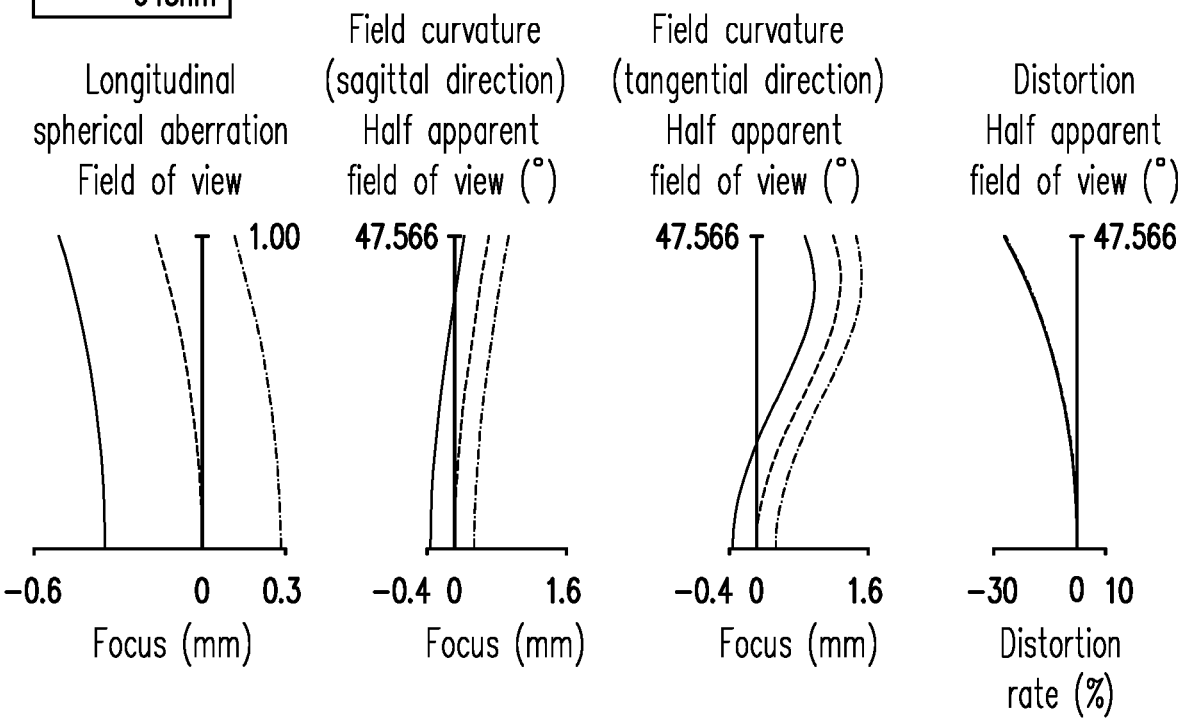
FIG. 24A to FIG. 24D illustrate a longitudinal spherical aberration and other aberrations of the ocular optical system according to the fifth embodiment of the invention.

The longitudinal spherical aberration of the fifth embodiment shown in FIG. 24A is obtained by simulating under a condition that the pupil radius is 2.000 mm (i.e., the eye pupil diameter EPD of the ocular optical system 10 is 4.000 mm). In FIG. 24A illustrating the longitudinal spherical aberration of the fifth embodiment, imaging point deviations of the off-axis rays in different heights are controlled within a range of ±0.54 mm. In FIGS. 24B and 24C illustrating the two field curvature aberrations, focal distance variations of the three representing wavelengths in the whole field of view fall within a range of ±1.6 mm. In FIG. 24D illustrating the distortion aberration, it is shown that the distortion aberration of the fifth embodiment is maintained within a range of ±28%. Accordingly, compared with the conventional ocular optical system, the ocular optical system of the fifth embodiment is able to render a desirable imaging quality under a condition that the system length is reduced to about 54.934 mm.

Based on the above, the fifth embodiment is advantageous over the first embodiment in that the half apparent field of view of the fifth embodiment is greater than that of the first embodiment.

Referring to FIG. 29, FIG. 29 shows a table with the respective optical parameters of the first to fifth embodiments. The unit of the parameters in the rows from "T1" to "SL" is mm, and the unit of "α" is degree.

When the relations of the respective optical parameters of the ocular optical system 10 according to the embodiments of the invention satisfy the following conditions or at least one of the following designs, the designer may be able to design an ocular optical system having a desirable optical performance and an effectively reduced overall length, and being technically plausible.

i. One of the surfaces of the lens element 3 is designed to be a Fresnel surface (including the plane type Fresnel surface or the curve type Fresnel surface), so as to reduce the thickness of the lens element, thereby making the overall system length shorter and the weight lighter.

ii. When the Fresnel surface (such as the display-side surface 32 of the lens element 3) satisfies $1.500 \leq R1/SagI \leq 4.000$, the stray light may be suppressed effectively, and the suppression is more significant when $1.700 \leq R1/SagI \leq 3.200$ is satisfied.

iii. When the ocular optical system satisfies $1.360 \leq ICD/EFL \leq 1.630$, the imaging quality is able to be maintained effectively while the half apparent field of view is large.

iv. When the Fresnel surface (e.g., the display-side surface 32 of the lens element 3) satisfies $25.000° \leq \alpha \leq 52.000°$, the effective sub-surfaces P1 of the Fresnel surface are less steep, and the stray light is also suppressed, and when the Fresnel surface satisfies $29.000° \leq \alpha \leq 48.500°$, the effect is more significant.

v. When the plane type Fresnel surface is adopted as the Fresnel surface (i.e., when the base surface B1 of the Fresnel surface is a plane), the ocular optical system 10 is generally lighter and thinner.

Considering the unpredictability in the design of optical system, under the framework of the invention, the ocular optical system 10 of the invention may have a shorter system length, a greater apparent field of view, a desirable imaging quality, or a desirable yield rate of assembling over the conventional art when the above condition is met.

In addition, regarding the relations exemplarily defined above, a number of such relations may be arbitrarily and optionally incorporated and applied in the embodiments of the invention, and the invention is not limited to the embodiments shown above. When carrying out the invention, in addition to the relations, the designer may further set structural details of the lens element such as the arrangement of concave, convex, and/or curved surface(s) of the lens element, so as to further control the system performance and/or the resolution. It should be noted that these details may be optionally incorporated and applied in other embodiments of the invention, if not conflicting.

In view of the foregoing, the longitudinal spherical aberration, field curvature aberration, and distortion aberration in the respective embodiments of the invention meet the standard of use. In addition, the off-axis rays at the three representing wavelengths, i.e., 643 nm (red light), 542 nm (green light), and 466 nm (blue light) in different heights are all concentrated at a vicinity of the imaging point. The extents of deviation of the respective curves show that the imaging point deviations of the off-axis rays in different heights are controlled, and desirable spherical aberration, image aberration, and distortion suppressions are rendered. The imaging quality data further suggest that the distances among the three representing wavelengths, i.e., 643 nm, 542 nm, and 466 nm, are also very close to each other, suggesting that the embodiments of the invention are able to desirably concentrate rays of different wavelengths in various states, so the embodiments of the invention exhibit an excellent chromatic dispersion suppressing ability. Hence, the embodiments of the invention are provided with a desirable optical performance. Consequently, the ocular optical system according to the embodiments is thinner and lighter-weighted, and has low stray light and renders a desirable optical imaging quality.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An ocular optical system, configured to allow imaging rays from a display frame to enter an eye of an observer through the ocular optical system to form an image, wherein a side toward the eye is an eye side, and a side toward the display frame is a display side, the ocular lens system comprises a lens element having an eye-side surface that is toward the eye side and allows imaging rays to pass through and a display-side surface that is toward the display side and allows the imaging rays to pass through;

wherein the lens element has an optical axis extending from the display side toward the eye side, the display-side surface of the lens element adopts a Fresnel lens design, and the ocular optical system satisfies:

$4.317 \leq EFL/T1 \leq 12.463$, wherein EFL represents an effective focal length of the ocular optical system, and T1 represents a thickness of the lens element on the optical axis, and wherein the ocular optical system comprises only one lens element having refracting power.

2. The ocular optical system according to claim 1, wherein the display-side surface has a plurality of effective sub-surfaces and a plurality of ineffective sub-surfaces, the effective sub-surfaces are configured to allow the imaging rays to form an image, each of the ineffective sub-surfaces connects two adjacent effective sub-surfaces, and the ocular optical system satisfies $1.500 \leq R1/Sag\ I \leq 4.000$, where SagI represents a total of lengths of a plurality of orthogonal projections of the effective sub-surfaces respectively projected onto the optical axis, and R1 represents a half of a clear aperture of the display-side surface.

3. The ocular optical system according to claim 1, wherein the display-side surface has a plurality of effective sub-surfaces and a plurality of ineffective sub-surfaces, the effective sub-surfaces are configured to allow the imaging rays to form an image, each of the ineffective sub-surfaces connects two adjacent effective sub-surfaces, and the ocular optical system satisfies $25.000° \leq \alpha \leq 52.000°$, where a represents a maximum tilting angle of the effective sub-surfaces relative to a reference plane perpendicular to the optical axis.

4. The ocular optical system according to claim 1, wherein the ocular optical system satisfies 4.011≤GD/T1≤11.837, where GD represents a distance on the optical axis from the display-side surface of the lens element to the display frame.

5. The ocular optical system according to claim 1, wherein the ocular optical system satisfies 1.619≤ER/T1≤4.285, where ER represents a distance on the optical axis from a pupil of the observer to the eye-side surface of the lens element.

6. The ocular optical system according to claim 1, wherein the ocular optical system satisfies 1.478≤GD/(ER+T1)≤2.239, where GD represents a distance on the optical axis from the display-side surface of the lens element to the display frame, and ER represents a distance on the optical axis from a pupil of the observer to the eye-side surface of the lens element.

7. The ocular optical system according to claim 1, wherein the ocular optical system satisfies 2.504≤R1/T1≤6.107, where R1 represents a half of a clear aperture of the display-side surface of the lens element.

8. The ocular optical system according to claim 1, wherein the ocular optical system satisfies 13.987≤(ICD+EFL+R1)/T1≤38.035, where ICD represents a diameter of an image circle of the display frame corresponding to a maximum angle of view of a single eye of the observer, and R1 represents a half of a clear aperture of the display-side surface of the lens element.

9. The ocular optical system according to claim 1, wherein the ocular optical system satisfies 10.865≤(ICD+GD)/T1≤31.301, where ICD represents a diameter of an image circle of the display frame corresponding to a maximum angle of view of a single eye of the observer, and GD represents a distance on the optical axis from the display-side surface of the lens element to the display frame.

10. The ocular optical system according to claim 1, wherein the ocular optical system satisfies 6.855≤ICD/T1≤19.464, where ICD represents a diameter of an image circle of the display frame corresponding to a maximum angle of view of a single eye of the observer.

11. The ocular optical system according to claim 1, wherein the ocular optical system satisfies 4.069≤(SL+EFL)/(ER+T1)≤5.597, where SL represents a distance on the optical axis from a pupil of the observer to the display frame, and ER represents a distance on the optical axis from the pupil of the observer to the eye-side surface of the lens element.

12. The ocular optical system according to claim 1, wherein the ocular optical system satisfies 9.670≤(ICD+R1)/T1≤25.571, where ICD represents a diameter of an image circle of the display frame corresponding to a maximum angle of view of a single eye of the observer, and R1 represents a half of a clear aperture of the display-side surface of the lens element.

13. The ocular optical system according to claim 1, wherein the display-side surface has a plurality of effective sub-surfaces and a plurality of ineffective sub-surfaces, the effective sub-surfaces are configured to allow the imaging rays to form an image, each of the ineffective sub-surfaces connects two adjacent effective sub-surfaces, and the ocular optical system satisfies 1.121 mm/°≤(GD+R1)/α≤1.660 mm/°, where GD represents a distance on the optical axis from the display-side surface of the lens element to the display frame, R1 represents a half of a clear aperture of the display-side surface, and α represents a maximum tilting angle of the effective sub-surfaces relative to a reference plane perpendicular to the optical axis.

14. The ocular optical system according to claim 1, wherein the ocular optical system satisfies 4.860≤(EFL+GD)/ER≤6.333, where GD represents a distance on the optical axis from the display-side surface of the lens element to the display frame, and ER represents a distance on the optical axis from a pupil of the observer to the eye-side surface of the lens element.

15. The ocular optical system according to claim 1, wherein the ocular optical system satisfies 2.034≤(ER+GD)/R1≤2.822, where ER represents a distance on the optical axis from a pupil of the observer to the eye-side surface of the lens element, GD represents a distance on the optical axis from the display-side surface of the lens element to the display frame, and R1 represents a half of a clear aperture of the display-side surface.

16. The ocular optical system according to claim 1, wherein the ocular optical system satisfies 1.425≤GD/R1≤2.128, where GD represents a distance on the optical axis from the display-side surface of the lens element to the display frame, and R1 represents a half of a clear aperture of the display-side surface of the lens element.

17. The ocular optical system according to claim 1, wherein the ocular optical system satisfies 1.735≤(T1+GD)/R1≤2.447, where GD represents a distance on the optical axis from the display-side surface of the lens element to the display frame, and R1 represents a half of a clear aperture of the display-side surface of the lens element.

18. The ocular optical system according to claim 1, wherein the ocular optical system satisfies 1.534≤EFL/R1≤2.269, where R1 represents a half of a clear aperture of the display-side surface of the lens element.

19. The ocular optical system according to claim 1, wherein the ocular optical system satisfies 1.763≤SL/(T1+R1)≤2.409, where SL represents a distance on the optical axis from a pupil of the observer to the display frame, and R1 represents a half of a clear aperture of the display-side surface of the lens element.

20. The ocular optical system according to claim 1, wherein the ocular optical system satisfies 2.520≤EFL/ER≤3.268, where ER represents a distance on the optical axis from a pupil of the observer to the eye-side surface of the lens element.

* * * * *